(12) United States Patent
Martin-Vegue et al.

(10) Patent No.: US 6,419,053 B1
(45) Date of Patent: Jul. 16, 2002

(54) CART BRAKE MECHANISM

(75) Inventors: Mike J. Martin-Vegue; James N. Winsor, both of Privado (CA)

(73) Assignee: Arral Industries, Inc., Ontario (CA)

( * ) Notice: Subject to any disclaimer, the term of this patent is extended or adjusted under 35 U.S.C. 154(b) by 0 days.

(21) Appl. No.: 09/743,069

(22) Filed: Jan. 4, 2001

Related U.S. Application Data

(63) Continuation of application No. PCT/US00/12237, filed on May 6, 2000.
(60) Provisional application No. 60/132,899, filed on May 6, 1999.

(51) Int. Cl.[7] .................................................. B62B 5/04
(52) U.S. Cl. ..................................... 188/19; 280/33.994
(58) Field of Search .................. 188/19, 20; 280/33.994

(56) References Cited

U.S. PATENT DOCUMENTS

| | | | |
|---|---|---|---|
| 3,486,587 A | | 12/1969 | Malloy |
| 4,976,447 A | | 12/1990 | Batson |
| 5,288,089 A | * | 2/1994 | Bowers et al. ......... 280/33.994 |
| 5,325,938 A | * | 7/1994 | King ........................... 188/19 |
| 5,735,367 A | | 4/1998 | Brubaker |
| 6,041,894 A | | 3/2000 | Otterson |

* cited by examiner

*Primary Examiner*—Christopher P. Schwartz
(74) *Attorney, Agent, or Firm*—Marvin H. Kleinberg; Marshall A. Lerner; KLEINBERG & LERNER LLP

(57) ABSTRACT

A brake mechanism, for use in connection with a portable cart having at least one wheel, includes an elongated rod rotatably coupled to the cart, a turning means coupled to the rod for rotating the rod about a centerline from a first position to a second position, at least one cam extending radially outward the said rod, a brake shoe means coupled to the cart, spring means disposed between the cart and the brake shoe means, the spring means being disposed so as to force the brake shoe means against the wheel of the cart, and wherein the at least one cam is disposed so as to compress the spring and force the brake shoe means away from the wheel when the rod is rotated from the first position to the second position.

7 Claims, 6 Drawing Sheets

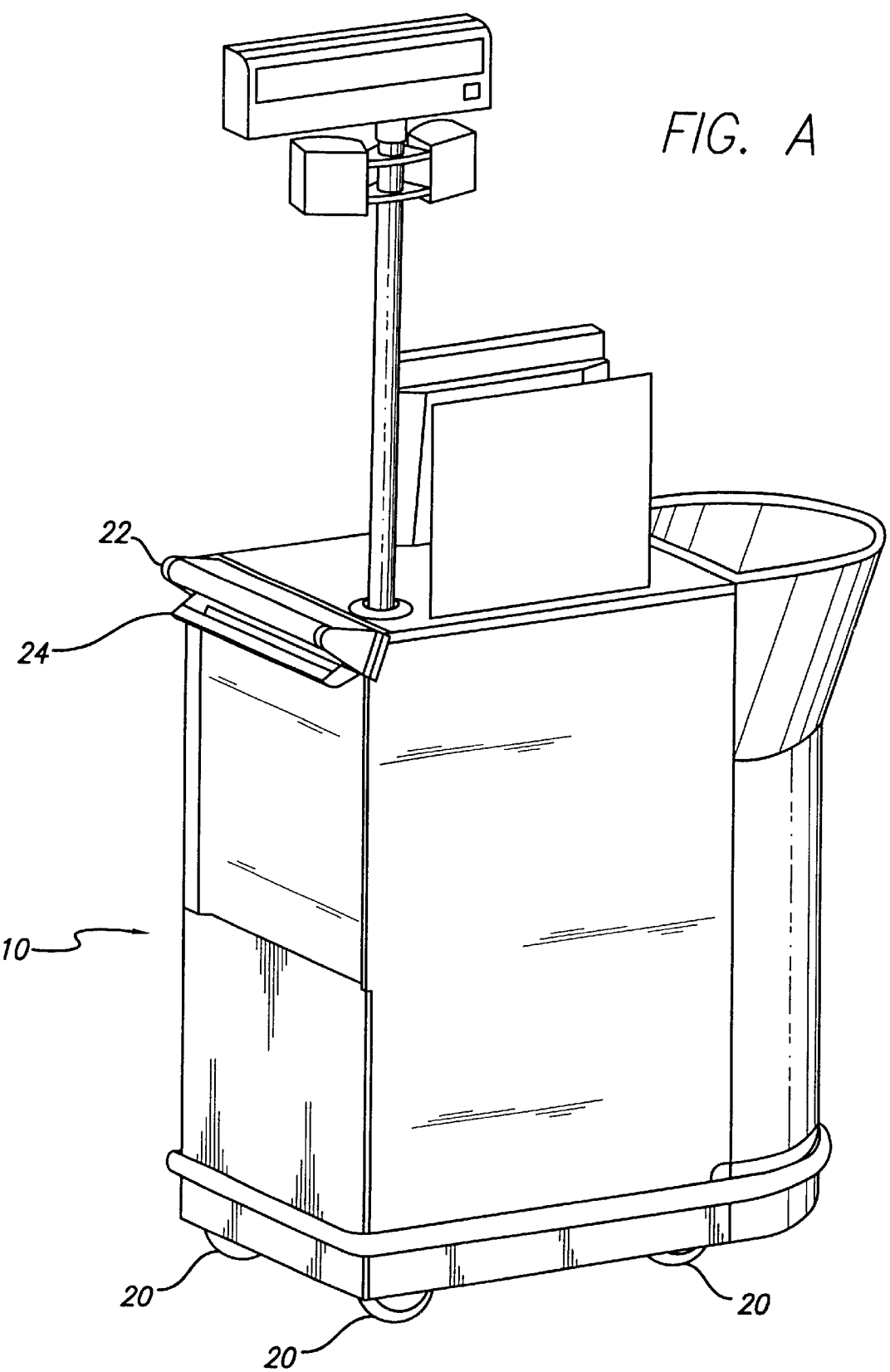
FIG. A

CART BRAKE MECHANISM

This application is a continuation-in-part of provisional application 60/132,899 filed May 6, 1999 and a continuation application from International Application S.N. PCT/US00/12237 filed May 6, 2000.

BACKGROUND OF THE INVENTION

1. Field of the Invention

The present invention relates to the field of braking mechanisms, and more specifically to a braking mechanism that can be used on or in connection with a wheeled cart or other device.

2. Description of the Related Art

One braking mechanism which is known in the prior art is described in U.S. Pat. No. 3,710,895. The device in the '895 patent describes a brake an retention system which can be used with food or beverage service cart of the type commonly found in commercial airliners. That patent taught the use of "feet" or other elements which could, when a handle was released, deploy and engage the floor surface. A pair of oppositely extended elements resist motion in both directions.

SUMMARY OF THE INVENTION

The present invention overcomes the limitations of the prior art by providing a braking mechanism which engages directly the wheels of the cart without requiring engagement with a carpet or other smooth surface floor. With the present invention, the braking mechanism consists of pairs of oppositely directed shoes that are spring loaded to engage a section of the wheel circumference. When engaged, any motion of the wheel is opposed by both a frictional and wedging contact with a brake shoe.

BRIEF DESCRIPTION OF THE DRAWINGS

FIG. A is a perspective view of a wheeled cart of the type which might employ the cart-brake mechanism of the present invention.

DESCRIPTION OF THE PREFERRED EMBODIMENTS

Figure 1:
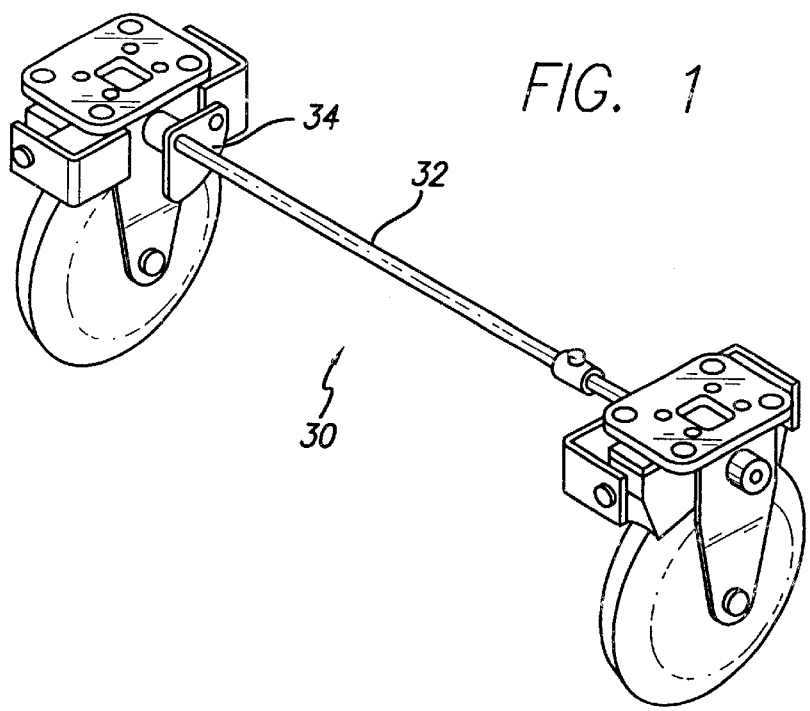
FIG. 1 is perspective view of a pair of wheeled casters connected by an axle which employs the cart-brake mechanism of the present invention.

A cart-brake mechanism for use with a wheeled cart or other device will be described. In the following description, for the purposes of explanation, specific components, operations and construction details are set forth in order to provide a more thorough understanding of the present invention. It will be apparent to those skilled in the art, however, that the present invention may be practiced without these specific details. In other instances, well known elements or other structures have not been described in detail so as not to obscure the present invention unnecessarily.

Referring first to Figure A, a wheeled cart which might employ the braking mechanism of the present invention is illustrated. The cart shown illustrates a cart with a spring loaded device that is free-wheeling so long as an operating mechanism such as a handle or grip is engaged. When the handle or grip is released, a cam mechanism rotates to permit spring-based brake shoes to engage the cart wheels and prevent motion in either the forward or reverse direction. It will be apparent to those skilled in the art, however, that the braking mechanism is not restricted to this type of cart, and can be used with any type of wheeled cart.

A cart 10, as shown in Figure A, includes wheels 20, a fixed handle 22, and movable handle 24. The location of the fixed handle 22 and movable handle 24 will be a matter of design choice, and will vary based on the type of cart used. The specific location of the handles is not a critical feature of the present invention. It has been found, however, that the arrangement of the handles 22, 24 in Figure A results in an efficient operation of the cart 10 while it is being moved from place to place.

Referring next to FIG. 1 the major components of the brake mechanism 28 are shown. In the preferred embodiment, the brake mechanism 28 is used with a pair of casters 30. These casters 30 are mounted on the bottom of the cart (not shown in FIG. 1) so as to be positioned on opposite sides of the cart and aligned to roll in a parallel path. Although the preferred embodiment uses a pair of casters 30, it will be apparent to those skilled in the art that a single caster may usefully employ the mechanism of the present invention and can hold a cart against movement.

A brake rod 32 coupled between the casters 30. The brake rod 32 is mounted so as to be free to rotate about its longitudinal axis. Attached to the brake rod 32 is a pull arm cam 34. The pull arm cam 34 is rigidly fixed to the brake rod 32. Although FIG. 1 illustrates a specific position for the pull arm cam 34, it will be apparent to those skilled in the art that the pull arm cam 34 can be placed at any position along the length of the brake rod with equal effectiveness.

Attached to the pull arm cam 34 is one end of a cable 40. The opposite end of the cable 40 is attached to the moveable handle 22 (shown in Figure A). The cable 40 is positioned within the cart 10 so as to be normally taut. When the movable handle 24 is depressed, the cable 40 pulls on the pull arm cam 34. This causes the brake rod 32 to rotate about its own axis. Further details concerning the operation of the brake mechanism are given below in connection with FIGS. 8 and 9.

Figure 2:
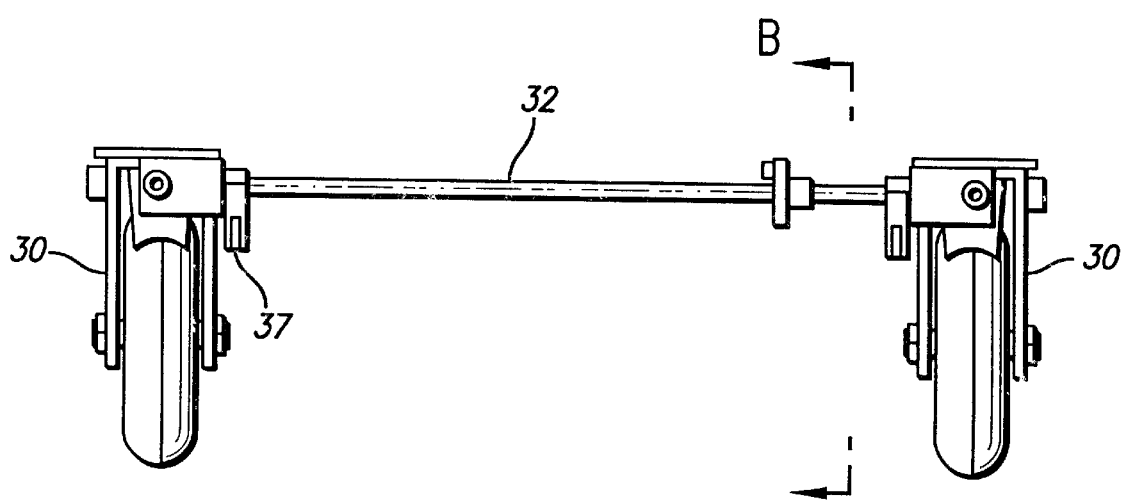
FIG. 2 is a front view of the caster and brake rod assembly used in the present invention.
Figure 3:
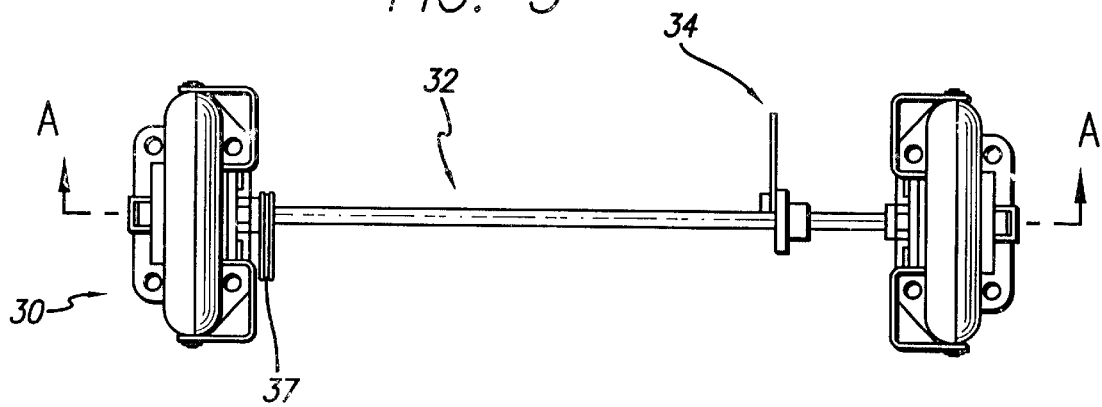
FIG. 3 is a bottom view of the caster and brake rod assembly used in the present invention.

Referring next to FIG. 2, a front view of the casters 30 and brake rod 32 is shown. FIG. 3 is a bottom view of the same assembly. FIGS. 2 and 3 more clearly illustrate the relationship between the casters 30 and the brake rod 32.

Figure 4:
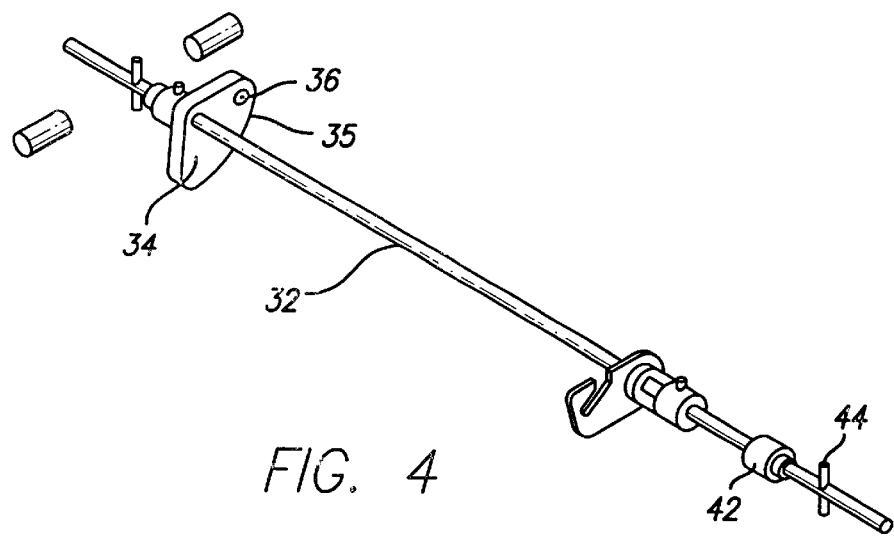
FIG. 4 is a detailed perspective view of brake rod assembly used in the present invention.

A detailed view of the pull arm cam 34 and brake rod 32 is shown in FIG. 4. As can be seen, the pull arm cam 34 is a thin member which is generally in the shape of a circle. The outer periphery of the pull arm cam 34 is curved. The curved edge has a narrow slot 37 formed into its edge. This slot is best shown in FIGS. 2 and 3. Also formed into the pull arm cam 34 is an aperture 36. The aperture 36 allows the cable 40 (not shown in FIG. 4) to anchor to the pull arm cam 34. The curved edge 35 of the pull arm cam 34 is provided so that rotation of the brake rod 32 smoothly takes up the cable 40. The pull arm cam 34 has attached to it a sleeve 38, and a threaded nut is placed within the sleeve 38 to rigidly attach the pull arm cam 34 to the brake rod 32.

Referring again to FIG. 4, the brake rod 32 includes a pair of bearings 42 which assist in the rotation of the brake rod 32. Located at each end of the brake rod 32 are pins 44, which mount the separation cams, described below with reference to FIGS. 8 and 9.

Figure 5:
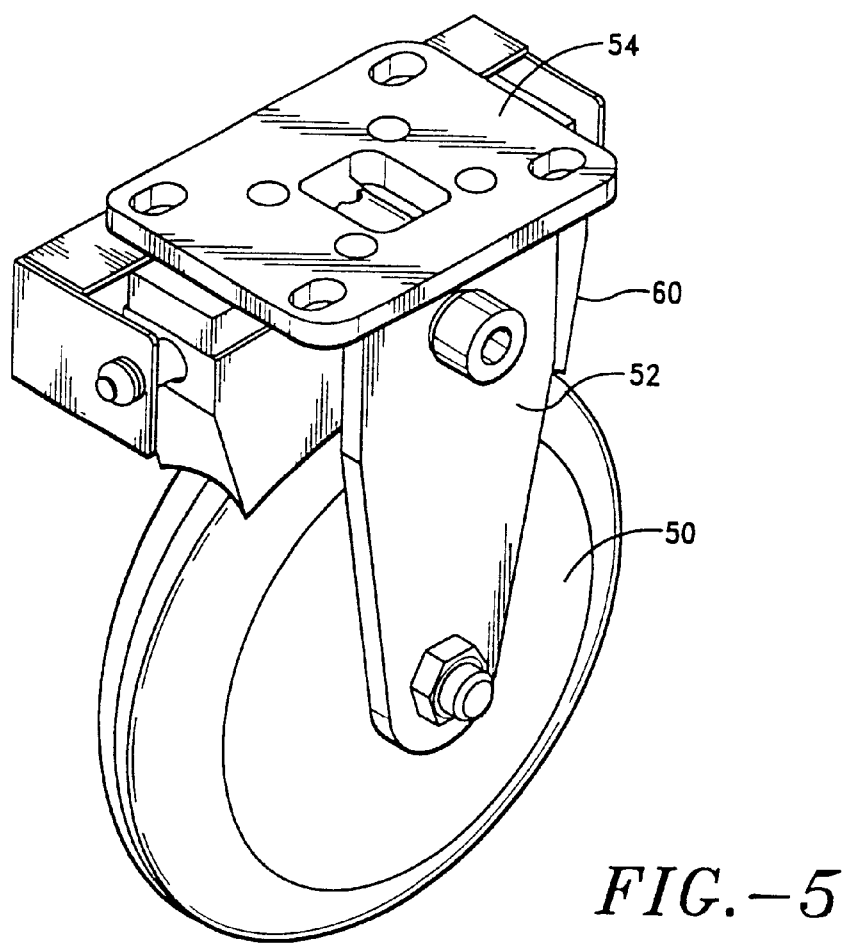
FIG. 5 is a perspective view of one of the casters.
Figure 6:
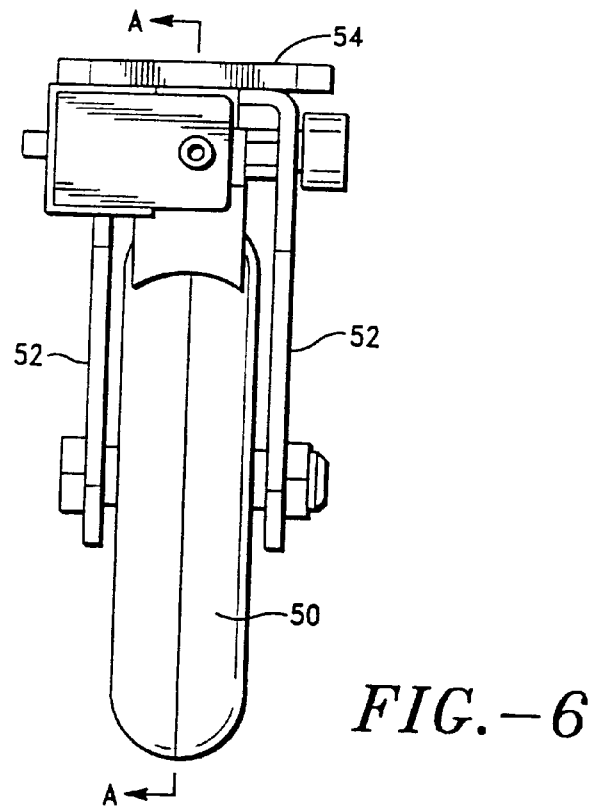
FIG. 6 is a front view of one of the casters.
Figure 7:
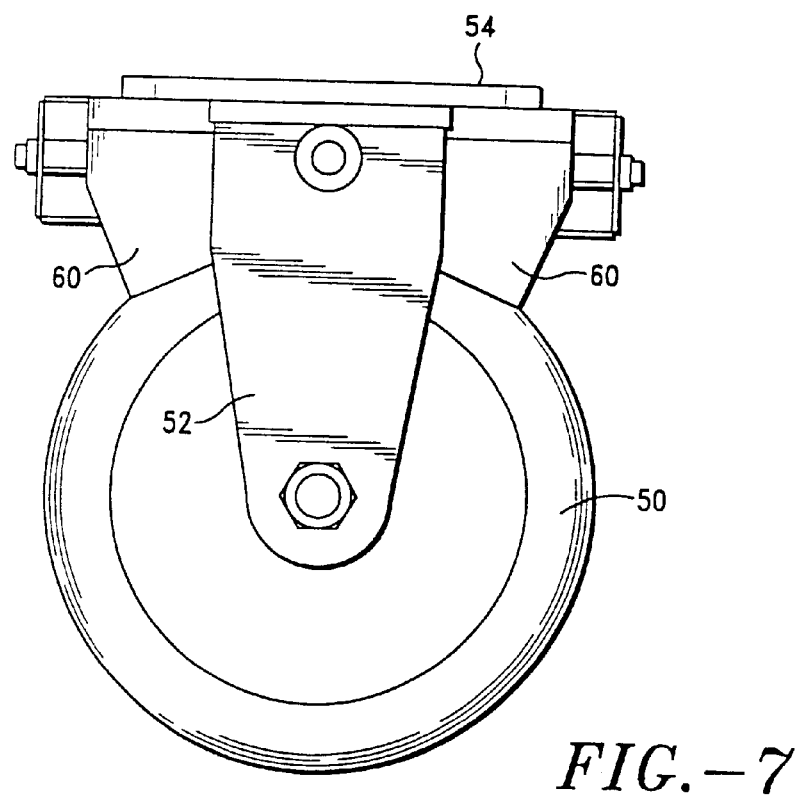
FIG. 7 is a side view of one of the casters.

Referring next to FIGS. 5, 6 and 7 further details of the casters 30 which are used in connection with the present invention are shown. FIG. 5 is a perspective view of a caster 30. FIGS. 6 and 7 are front and side views of the caster 30, respectively. The caster 30 includes a wheel 50. The wheel 50 is supported by two support arms 52. Attached to the top of the support arms 52 is a mounting plate 54. The mounting plate 54 attaches the caster 30 to the cart 10. Also included in the caster 30 are a pair of brake shoes 60. The structure and operation of the brake shoes are described below in connection with FIGS. 8 and 9.

Figure 8:
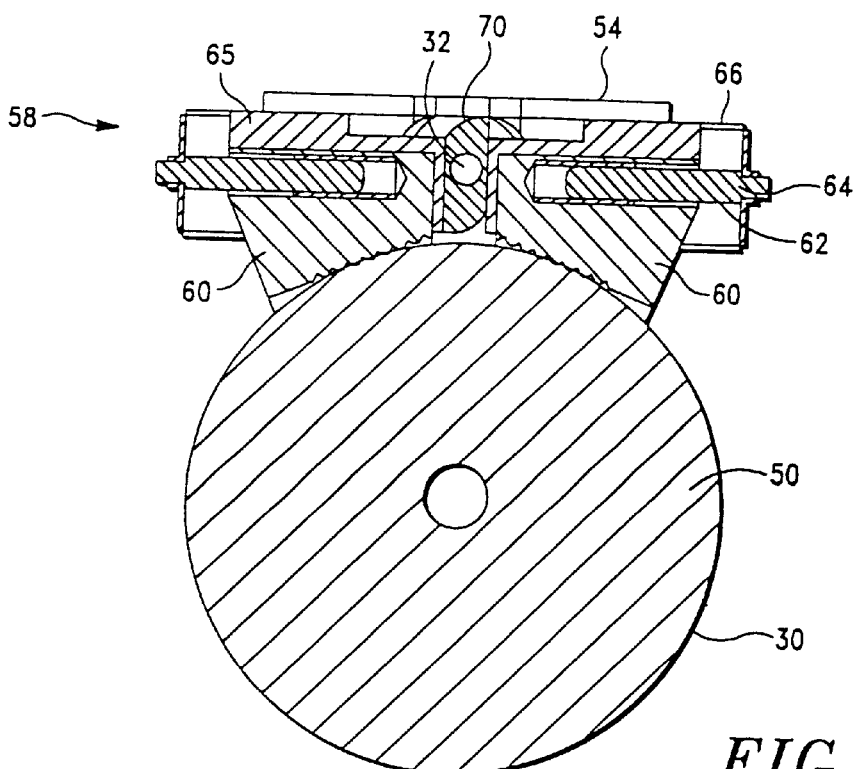
FIG. 8 is a cross sectional view of the caster taken along the line A—A in FIG. 6, showing the brake shoes in the locked position.
Figure 9:
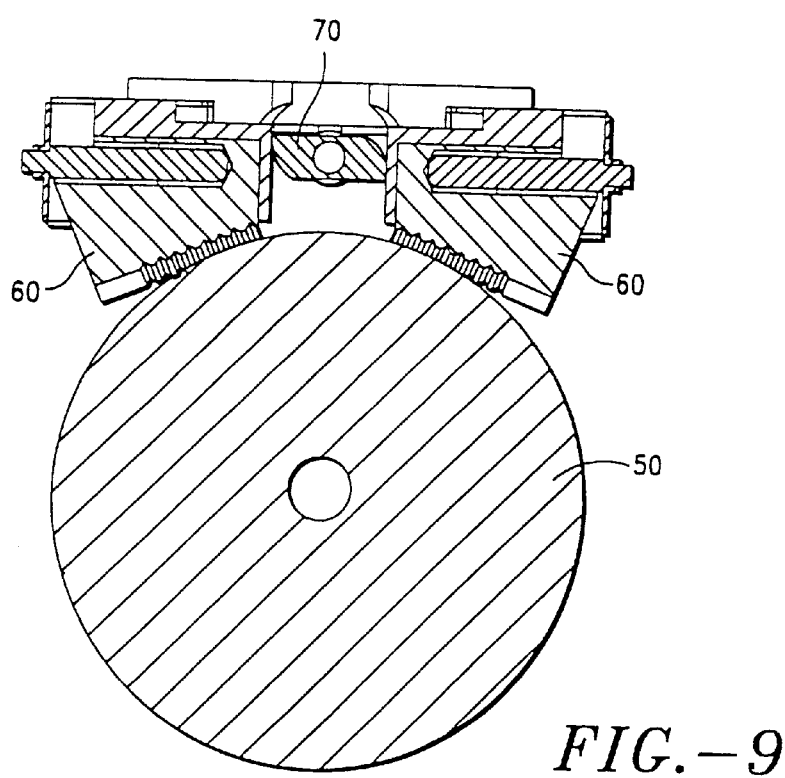
FIG. 9 is a cross sectional view of the caster taken along the line A—A in FIG. 6, showing the brake shoes in the unlocked position.

FIGS. 8 and 9 are cross sectional views of the caster 30 taken along the line A—A in FIG. 6. For the purposes of simplicity, the representation of the support arms has been removed from this Figure. FIG. 8 shows the marking mechanism in its normal locked position. The brake shoes 60 are forced inwards by a spring 62. The brake shoes 60 contact the wheel 50 and the frictional force exerted prevents the wheels from turning. Each brake shoe 60 prevents the wheel 50 from turning in a particular direction. When the wheel 50 rotates in the clockwise direction, the brake shoe 60 on the right acts to stop the motion of the wheel 50. When the wheel 50 rotates in the counterclockwise direction, the brake shoe 60 on the left engages the wheel 50.

Figure 10:
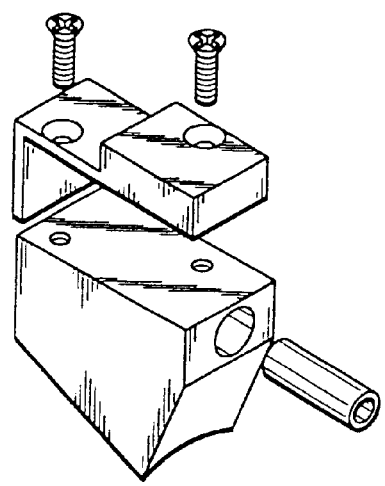
FIG. 10 is an exploded perspective view of the brake shoe assembly.

Referring again to FIG. 8, it can be seen that the brake shoes 60 are directed in their travel by guide pins 64. A guide pin bracket is attached to the mounting plate 54 of the cater 30. This bracket is used to support both the guide pins 64 and the brake shoe 60. Attached to the brake shoe 60 is a slide 65. The slide 65 is fixed to the brake shoe 60. It bears against the mounting plate 54 as the brake shoe 60 travels in and out. An exploded perspective view of the brake shoe, the guide pin and the slide are shown in FIG. 10.

FIG. 8 also illustrates an end view of the mounting rod 32. Attached to the mounting rod is a separation cam 70. The separation cam 7 attaches to the mounting pins 44 which were described above with respect to FIG. 4. It is to be understood that the mounting rod 32 and separation cam 70 are not a part of the caster 30. The separation cams 70 are used to unlock the brake shoes 60 from their normally locked position.

The operation of the mounting cam 70 is best illustrated in FIG. 9. FIG. 9 is a cross sectional view of the caster 30 taken along the line A—A in FIG. 6. Unlike FIG. 8, FIG. 9 shows the brake mechanism in the unlocked position. In this Figure, the separation cam 70 has been rotated through approximately ninety degrees. The edges of the cam 70 contact the brake shoes 60. This forces the brake shoes 60 apart and away from the wheels 50, thereby allowing the wheels 50 to rotate freely.

The operation of the brake mechanism of the present invention is, as indicated above, quite simple. In a normal resting situation, the brake shoes 60 are forced into the wheel's 50, causing the wheels 50 to be locked in place, and thereby preventing movement of the cart. When it is desired to move the cart, the moveable handle 40 is depressed. This causes the cable 40 which is attached to the handle to pull against the pull arm cam 34. The pull arm cam 34 in turn rotates the brake rod 32. The separation cam 70 is fixed to the brake rod 32. The separation cam 70 also turns, thereby forcing the brake shoes 60 apart, and away from the wheels. The cart 10 is then free to move. When the movable handle 40 is released, the springs 62 force the brake shoes 60 against the wheels 50. This locks the wheels 50 in place, and prevents movement of the cart 10.

What is claimed is:

1. A brake mechanism, for use in connection with a portable cart having at least one wheel, said mechanism comprising:

an elongated rod rotatably coupled to the cart;

turning means coupled to said rod for rotating said rod about a centerline from a first position to a second position;

at least one cam extending radially outward from said rod;

brake shoe means coupled to the cart;

spring means disposed between the cart and said brake shoe means, said spring means being disposed so as to force said brake shoe means against the wheel of the cart;

wherein said at least one cam is disposed so as to compress said spring and force said brake shoe means away from said wheel when said rod is rotated from said first position to said second position.

2. The turning means of claim 1 further comprising:

a fixed handle for pushing the cart;

a movable handle coupled to the cart, parallel to and in close proximity to the fixed handle;

a cable having a distal end and a proximate end, said cable attached at first proximate end to said moveable bar and at said distal end to the at least one cam for orienting said cam in response to the movable handle movement.

3. The brake mechanism of claim 1 comprising at least three cams, wherein:

the spring means of claim 1 comprises a first spring mechanism in close proximity to a first wheel and a second spring mechanism in close proximity to a second wheel;

the said one cam is coupled between the ends of said rod; and the second and third of said cams is coupled to said rod at either end of said rod and seated between said second and third spring mechanisms respectively such that the rotation of said rod causes the second and third said cams to rotate into a position that pushes against said second and third spring mechanisms, causing said spring mechanisms to compress.

4. The brake mechanism of claim 1 wherein said brake shoe means further comprises:

a brake shoe having an arcuate surface adapted to engage the corresponding arcuate surface of a wheel adjacent thereto;

said brake shoe being movable on a plane aligned tangentially to the surface of said wheel;

said spring means being coaxial with said tangent for biasing said brake shoe arcuate surface against said wheel arcuate surface;

a pull arm cam coupled between the ends of said rod; and a second and third separating cam coupled to said rod at opposite ends; and said second cam adjacent to said brake shoe such that the rotation of said rod causes the second said cam to rotate into a position that pushes said brake shoe against said first spring mechanism, disengaging said brake shoe from said wheel arcuate surface.

5. The brake mechanism of claim 1 further comprising:

a first one guide pin mounted to the brake mechanism and aligned to be parallel to a tangent to the wheel adjacent to a first upper quadrant thereof;

a second guide pin mounted to the brake mechanism and coaxial with said first guide pin and adjacent to a second upper quadrant thereof;

a first brake shoe slidably mounted on said first guide pin;

said spring means including a first bias means between said first brake shoe and said mechanism for urging said brake shoe into engagement with the wheel in said first upper quadrant;

a second brake shoe slidably mounted on said second guide pin;

said spring means including a second bias means between said second brake shoe and said mechanism for urging said brake shoe into engagement with the wheel in said second upper quadrant;

the braking surfaces of said first brake and said second brake shoes being shaped to engage the arcuate surfaces of the wheel; and a separation cam between said first and second brake shoe and oriented such that in a first position, said cam forces said first and second brake shoes onto said guide pin in opposite directions against said bias means into an unbraked position and in a second orientation permitting said first and second brake shoes to be biased in the engagement with the surface of said wheel.

6. In a cart having a frame with a front end, a back end, two sides and a bottom:

a carriage coupled to said frame;

at least one wheel coupled to said frame;

a fixed handle coupled to said frame;

a moveable handle coupled and parallel to said fixed handle;

braking means comprising a brake assembly on at the one of the wheel;

a brake rod horizontally parallel to the back end of the frame and coupled to engage the brake assembly;

a brake rod pull arm on said brake rod, said brake rod pull arm coupled to said moveable handle by a cable connected at its proximate end to said movable handle and at its distal end to said brake rod pull arm for rotating said brake rod;

a pull arm spring biased to hold said movable handle in a first orientation and moving the moveable handle in a first direction causes said brake rod pull arm to rotate in a second and opposite direction;

said brake rod coupled to said brake assembly;

said brake assembly comprising a separation cam, first brake shoe and a spring biasing said brakes against a wheel;

said brake shoe having an arcuate surface adapted to engage a corresponding arcuate surface of the wheel;

said brake shoe being movable in a plane parallel to a tangent to the surface of said wheel;

spring means biasing said brake shoe's arcuate surface against the wheel arcuate surface; and a separation cam mounted on said brake rod for rotation by said brake rod and positioned adjacent to said brake shoe such that said motion of said separation cam moves said brake shoe away from the wheel against the bias of said spring means;

whereby moving said movable handle from its resting position rotates said brake rod pull arm, said brake rod and said separation cam in a first direction, thereby disengaging said brake shoe from the wheel.

7. The braking means of claim 6, above, wherein said braking means include a support post upon which said spring means and brake shoe are mounted, for translational motion into engagement with the wheel under the urging of said spring means and, in response to said separation cam movement in a second direction, out of engagement with the wheel against the urging of said spring means.

* * * * *